(12) United States Patent
Leung

(10) Patent No.: US 6,374,725 B1
(45) Date of Patent: Apr. 23, 2002

(54) COFFEE MAKER

(75) Inventor: Chi-Wah Leung, Hong Kong (HK)

(73) Assignee: Simatelex Manufactory Co., Ltd., Hong Kong (HK)

( * ) Notice: Subject to any disclaimer, the term of this patent is extended or adjusted under 35 U.S.C. 154(b) by 0 days.

(21) Appl. No.: 09/659,761

(22) Filed: Sep. 11, 2000

(51) Int. Cl.⁷ ............................................... A47J 31/30
(52) U.S. Cl. .......................................... 99/293; 99/280
(58) Field of Search ........................ 99/280, 281, 283, 99/282, 293, 307; 392/465, 467, 480

(56) References Cited

U.S. PATENT DOCUMENTS 5,440,972 A * 8/1995 English ....................... 99/282
5,738,001 A * 4/1998 Liverani ...................... 99/283
6,000,317 A * 12/1999 Van Der Meer .............. 99/282

* cited by examiner

Primary Examiner—Reginald L. Alexander
(74) Attorney, Agent, or Firm—Jackson Walker L.L.P.

(57) ABSTRACT

An electric automatic-drip coffee maker has a valve at a bottom of a water reservoir. In use, at turn ON, the valve remains initially closed so that a heater can heat up in a dry condition. When the valve is opened, steam is initially supplied to a brew basket and thereafter hot water is dripped into the brew basket in conventional fashion. The heater also supplies steam separately and continuously to a top of a carafe during brewing. A water supply for supplying this steam is drawn from the reservoir through a restricted outlet. The steam initially heats up the carafe and thereafter keeps the carafe warm.

2 Claims, 4 Drawing Sheets

COFFEE MAKER

BACKGROUND OF THE INVENTION

1. Field of the Invention

The present invention relates to a coffee maker.

2. Description of Prior Art

In a conventional electric automatic-drip coffee maker, water is stored in a reservoir. When the coffee maker is turned ON, a heater is supplied with water from the reservoir and heats the water so that the water is fed up (effectively "pumped up") to drip into coffee grounds in a filter basket, The filter basket is mounted above a carafe that collects the coffee. With this type of conventional heater for pumping the water, some water is stored in the system beyond the heater which is supplied initially to the filter basket and is not heated. Also, the overall temperature of coffee collected in the carafe is often not hot enough or does not remain hot enough for best results. In some cases, a thermal (more expensive) carafe is used to reduce this problem. It is supposed at present, a coffee maker should be able to brew hot coffee at at least 84 deg. C.

SUMMARY OF THE INVENTION

It is an object of the invention to overcome or at least reduce these problems.

According to the invention there is provided an electric automatic drip coffee maker including a water reservoir, an in-line electric water heater, a valved water passage between the reservoir and the water heater and an electrically operable controller for the valve, in which the electric controller is arranged to open the passage a predetermined time after the water heater is turned ON at the beginning of a coffee making cycle.

The coffee maker may include a second water passage, in which the water heater has two respective heating chambers, one for each of the passages, and in which a flow rate in the second channel is controlled to be at a slow rate so that the water is converted into steam in the heater for supply to a carafe of the coffee maker.

The valve is preferably arranged to simultaneously open the first and second passages.

BRIEF DESCRIPTION OF THE DRAWING

An electric automatic-drip coffee maker according to the invention will now be described by way of example with reference to the accompanying drawings in which;

FIG. 1 is a sectional elevation of the coffee maker before it is switched ON;

FIG. 2 is a sectional elevation of the coffee maker soon after it is first switched ON;

DESCRIPTION OF THE PREFERRED EMBODIMENTS

Figure 1:
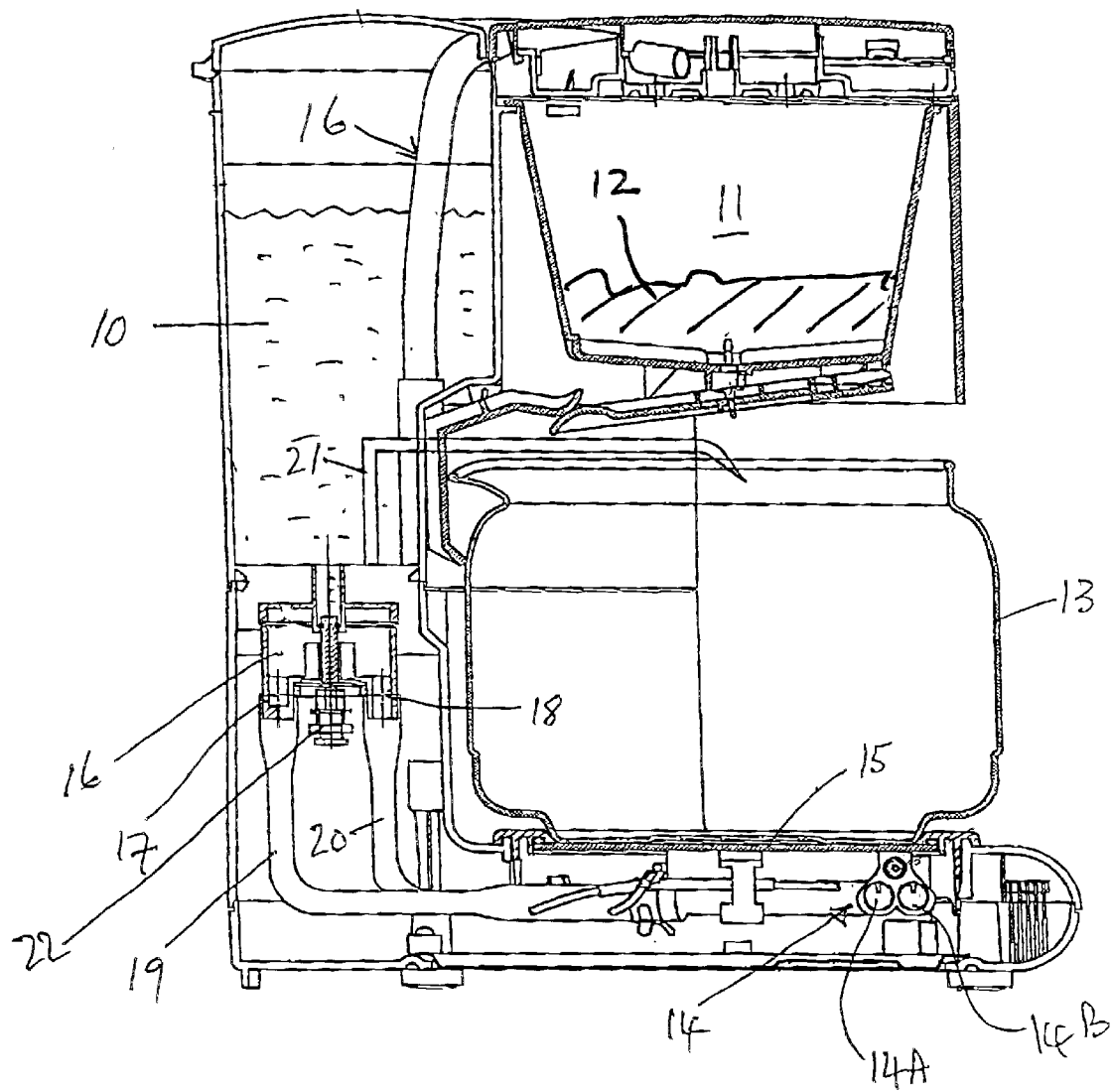

Referring to the drawings, the coffee maker is of a generally known conventional form having a water reservoir 10, a brew basket 11 for retaining coffee grounds 12, a carafe 13, an electric heater 14 and a carafe support plate 15. In use, when the coffee maker is turned ON, water is supplied from the reservoir 10 to the heater 14 and heated so as to be pumped up a tube 16 and drip onto the coffee grounds. Coffee is collected in the carafe 13. This represents the operation of widely used coffee makers currently available in the market place.

Embodiments of the present invention differ from the prior art by having a controllable valve 16 at a base of the reservoir 10. In the described embodiment a single valve has twin outlets 17 and 18 for supplying water to separate passages or tubes 19 and 20. The heater 14 also has twin (separate) heating chambers 14 A and 14 B, The chamber 14 A is connected to the tube 16 and the chamber 14 B is connected to a steam tube 21. An electrically operated solenoid 22 is provided for operating the valve 16.

Figure 2:
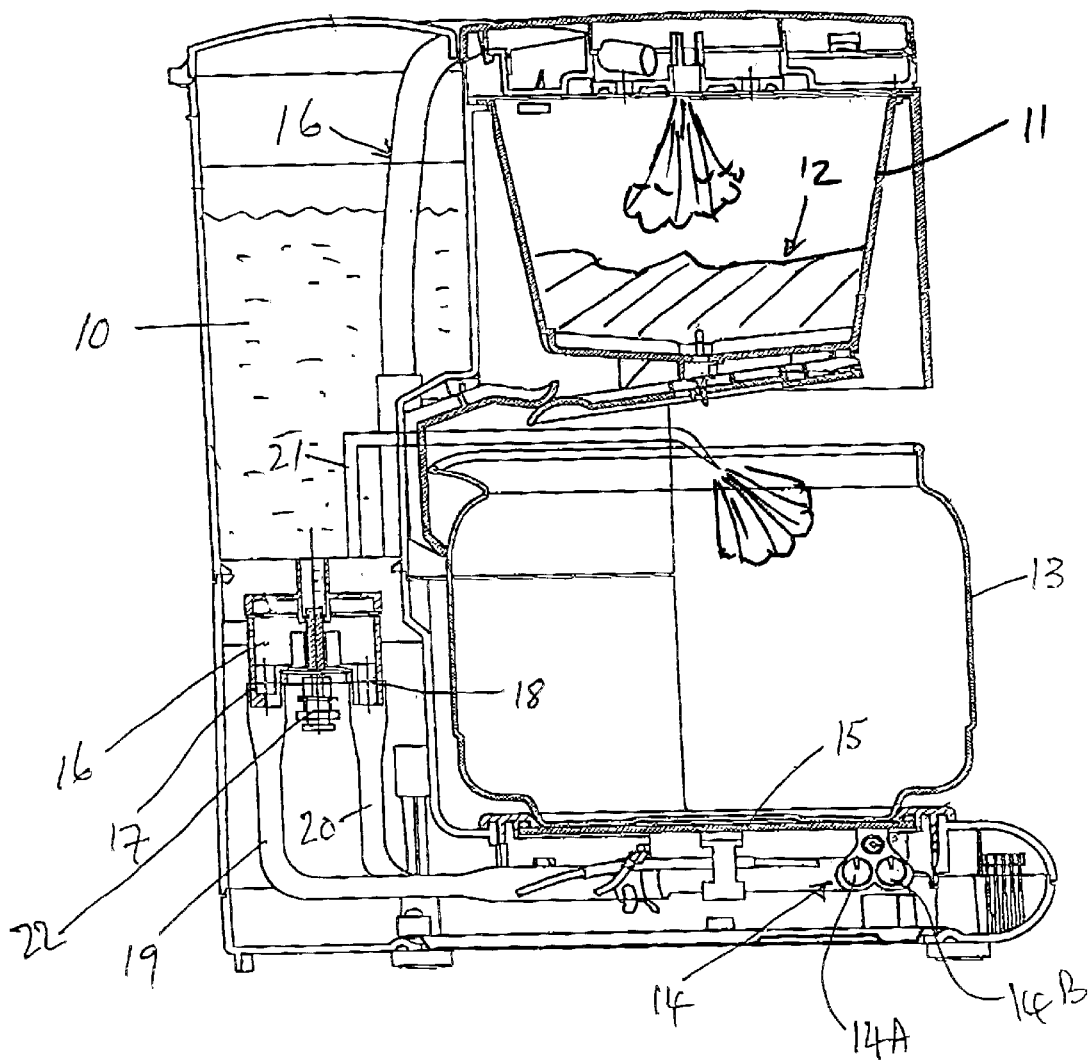
Figure 3:
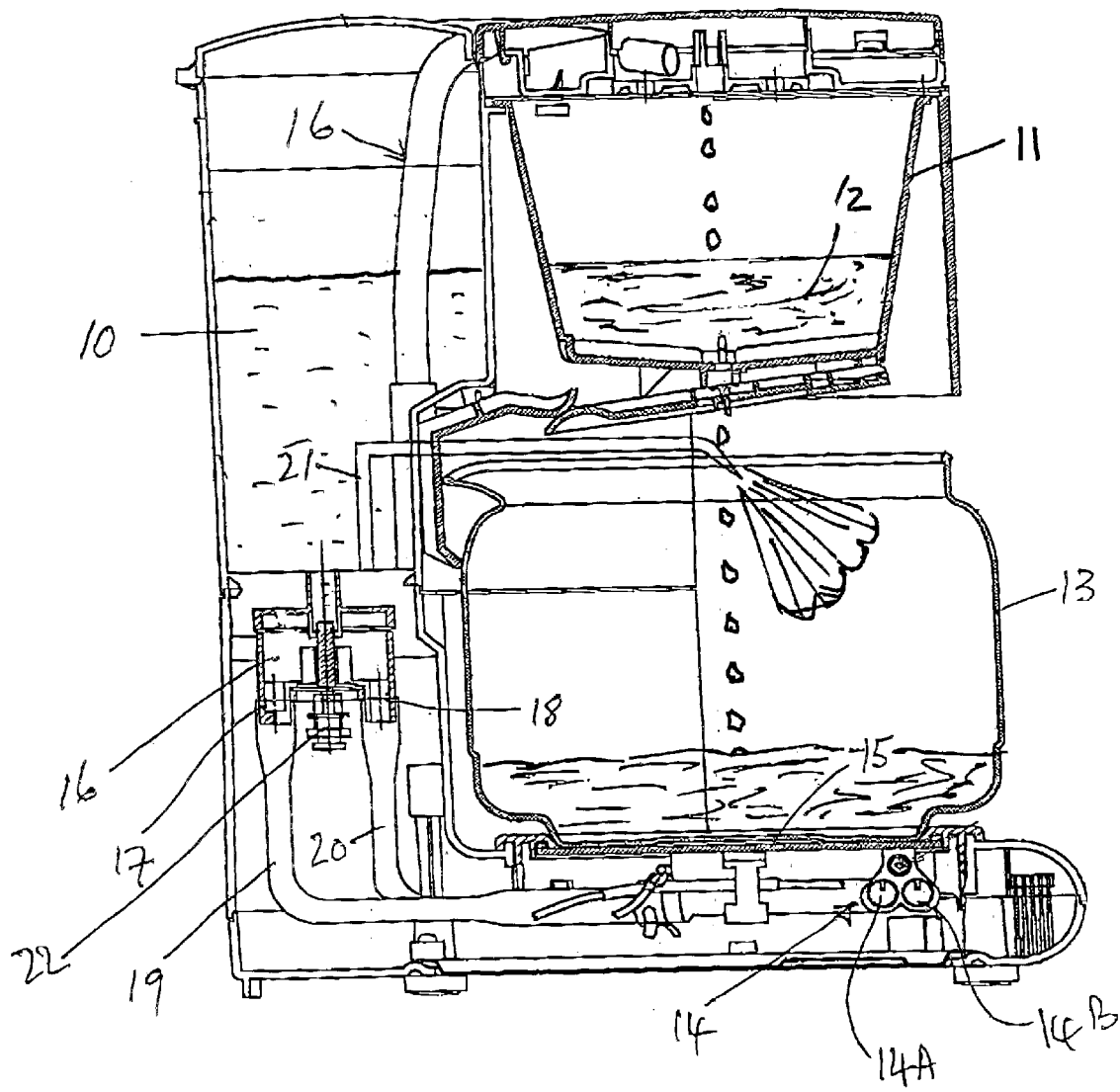
FIG. 3 is a sectional elevation of the coffee maker after it has switched on for a few minutes.
Figure 4:
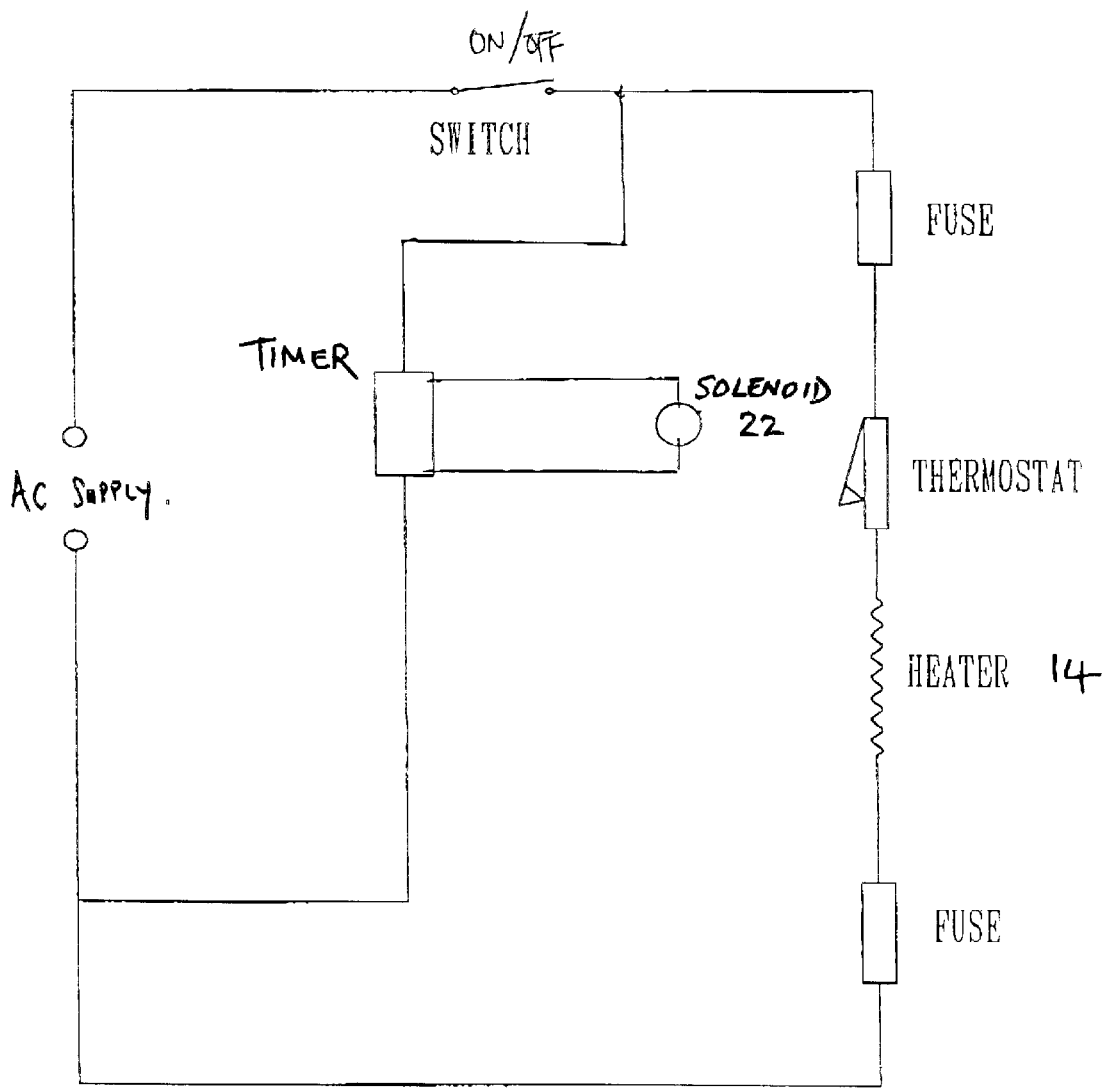
FIG. 4 is a schematic circuit diagram of the coffee maker.

In use in embodiments of the invention, using the time delay as depicted in FIG. 4, when the coffee maker is initially turned ON, the valve 16 remains closed. This allows the heater 14 to heat up. Normally, because the valve 14 is closed before switch ON, there is no water in the tube 16 so the heater 14 heats up rapidly "in a dry condition". (The contrasts with prior art coffee makers where water filled into the reservoir 10 would normally flow to and fill up the heater as well as fill partially up the tube 16.) After a short time interval, the valve 16 is opened so that water can f low to the heater 14. As a result, steam is immediately generated initially and supplied to the brew basket 11, See FIG. 2. Thereafter, a drip supply of hot water flows up the tube 16 and drips into the basket 11, as illustrated in FIG. 3, and as happens in prior art arrangements.

The arrangement provides a first advantage over the prior art where cold water and not very hot water is initially supplied to the brew basket 11. This is believed to detrimentally affect the brewing and clearly reduces the overall coffee temperature that can be attained.

The outlet 17 is a restricted outlet arranged so that water flows into the tube 19 at a slow rate. The rate is sufficiently slow such that water reaching the chamber 14 B is immediately converted into steam and a continuous supply of steam is fed to a top of the carafe 13. Supplying steam to the top of the carafe minimizes any contact of hot coffee with cold air throughout the whole of the brewing cycle. The supply of steam starts immediately after the valve 18 is opened, see FIG. 2, and continues, as shown in FIG. 3, to heat up the carafe initially or retain its temperature throughout the brewing cycle.

This arrangement provides a second advantage; not only is the carafe pre-heated by the steam from the tube 21 but the coffee in the carafe is kept warm during the whole brewing cycle without the need of using, for example, a relatively expensive thermal carafe.

I claim:

1. An electric automatic drip coffee maker comprising;
a water reservoir;
an in-line electric water heater;
a valved water passage between the reservoir and the water heater;
an electrically operable controller for the valve, wherein the electric controller is arranged to open the passage a predetermined time after the water heater is turned ON at the beginning of a coffee making cycle; and
a second water passage, in which the water heater has two respective heating chambers, one for each of the passages, and in which a flow rate in the second channel is controlled to be at a slow rate so that the water is converted into steam in the heater for supply to a carafe of the coffee maker.

2. A coffee maker according to claim 1, in which the valve is arranged to simultaneously open the first and second passages.

* * * * *